(12) United States Patent
Gyanchandani et al.

(10) Patent No.: US 11,776,021 B1
(45) Date of Patent: Oct. 3, 2023

(54) SYNCHRONIZING PRESENTATION ACROSS MULTIPLE DEVICES

(71) Applicant: Amazon Technologies, Inc., Seattle, WA (US)

(72) Inventors: Narendra Gyanchandani, Sammamish, WA (US); Andrew Sutherland, Seattle, WA (US); Rajesh Babel, Redmond, WA (US); Bilyana Slavova, Redmond, WA (US); Rajan Navnitbhai Parmar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 16/837,920

(22) Filed: Apr. 1, 2020

(51) Int. Cl.
*G06Q 30/02* (2023.01)
*G06Q 30/0283* (2023.01)
*G06Q 30/0601* (2023.01)

(52) U.S. Cl.
CPC ....... *G06Q 30/0283* (2013.01); *G06Q 30/0629* (2013.01); *G06Q 30/0641* (2013.01)

(58) Field of Classification Search
CPC ............ G06Q 30/0641; G06Q 30/0629; G06Q 30/0283; G06Q 20/201; G06Q 20/42
USPC .. 705/400, 7.31, 7.35, 14.42, 14.72; 235/375
See application file for complete search history.

(56) References Cited

U.S. PATENT DOCUMENTS 7,685,023 B1* 3/2010 Abraham et al. .. G06Q 30/0603
705/27.2
2003/0083956 A1* 5/2003 Freeny, Jr. ............. G06Q 20/20
705/14.35
2005/0139662 A1* 6/2005 Eglen et al. ........... G06Q 30/06
235/383
2012/0326849 A1* 12/2012 Relihan et al. ........ G07G 1/145
340/10.6

(Continued)

FOREIGN PATENT DOCUMENTS

CN 110012439 A * 7/2019
KR 20210104960 A * 8/2021

OTHER PUBLICATIONS

Benjamin Kralj, "How to Synchronize Your Retail and E-Commerce Prices?", Sep. 18, 2019, linkedin.com, 9 pages. (Year: 2019).*

Chris Petersen, PhD., "Should retail prices in-store be the same as online?" Oct. 11, 2016, 18 pages (Year: 2016)*

(Continued)

*Primary Examiner* — Shannon S Campbell
*Assistant Examiner* — Freda A Nelson
(74) *Attorney, Agent, or Firm* — Eversheds Sutherland (US) LLP

(57) ABSTRACT

Devices, systems, and methods are provided for synchronizing presentation across multiple devices. A method may include receiving, by a first device, a first price associated with a product and a first time, wherein the first price is presented in a virtual location. The method may include determining a second price and a second time, the second price associated with the product, wherein the second price is presented at a physical location. The method may include determining that the first time is after the second time. The method may include determining a difference between the first price and the second price. The method may include generating, based on the difference, one or more application programming interface (API) calls associated with replacing, at the physical location, presentation of the second price with presentation of the first price.

20 Claims, 6 Drawing Sheets

(56) References Cited

U.S. PATENT DOCUMENTS

| | | | | |
|---|---|---|---|---|
| 2014/0310129 | A1* | 10/2014 | Martin | G06F 3/147 |
| | | | | 705/26.61 |
| 2015/0106179 | A1* | 4/2015 | Chow et al. | G06Q 30/0215 |
| | | | | 705/14.17 |
| 2016/0134930 | A1* | 5/2016 | Swafford | A47F 5/0068 |
| | | | | 725/80 |
| 2016/0313959 | A1* | 10/2016 | Abell | G06Q 30/02 |
| 2019/0370838 | A1* | 12/2019 | Vierra | G06Q 30/0206 |

OTHER PUBLICATIONS

Harkness, Adam, "What is a VPN tunnel?" Feb. 19, 2019, netmotionsoftware.com, 5 pages. (Year: 2019).*

Rafi Mohammed, "How Retailers Should Think About Online Versus In-Store Pricing" Jan. 26, 2017, hbr.org, 5 pages (Year: 2017)*

* cited by examiner

SYNCHRONIZING PRESENTATION ACROSS MULTIPLE DEVICES

BACKGROUND

Consumers increasingly are able to purchase items from a variety of sources, including in physical locations and online. Prices of items may fluctuate over time based on a variety of factors, such as supply and demand. The price of an item that a consumer sees in one location may not be the most updated price and may be inconsistent with the price of an item that the consumer sees in another location. For example, the presented price of an item at a physical retailer location may be different at the same time as the presented price of the same item online. Therefore, there is a need for synchronizing pricing data across multiple devices and systems to provide a consistent, updated price to consumers.

Figure 1:
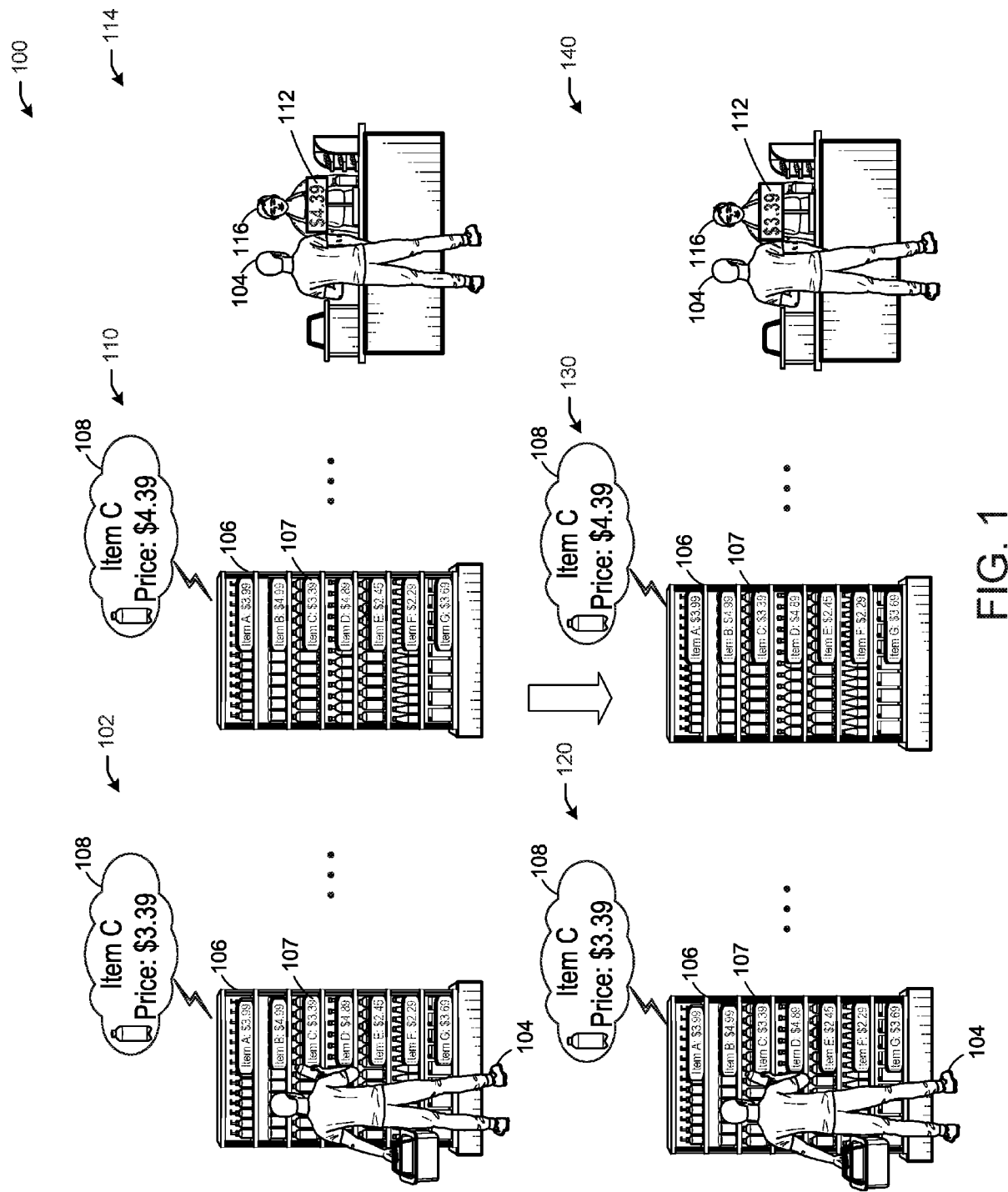
FIG. 1 illustrates an example system for synchronizing presentation across multiple devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for synchronizing presentation across multiple devices.

Products are being sold at both physical locations (e.g., retailer stores) and online. Because the online price of a product may fluctuate over time, the presented price of the product at a physical retailer location may need to be updated in real-time to maintain a consistent price presented for the product. For example, a customer's experience may be undermined when they take an item from a shelf of a physical location and expect to pay the price presented at or near the shelf, and then find that the price at the checkout counter has increased or that the online price for the same item was lower than what they paid in the store. To update the physically displayed prices of a product to maintain consistency with online prices may require frequent physical changes to price labels (e.g., printing and installing new price labels).

Not only may the online price of a product not match the displayed price at a given time, but prices displayed within a physical location for the product may conflict with one another. For example, a price displayed for the product on a shelf may not be the same price that rings up when the consumer is at the checkout counter (e.g., the point-of-sale), and one price label for the product in a store may not match another displayed price for the same product in the same store.

The use of electronic shelf labels (ESLs) in physical retail locations may allow for improved synchronization of prices presented within the same physical location and online. However, when prices change frequently (e.g., dozens or even hundreds of times per day), the ESLs may need to update frequently, and the price of a product may change during the time that a consumer takes an item from a store shelf to the point-of-sale for checkout. Such price updating may undermine a consumer's experience. Also, because the updating of displayed prices at multiple locations (e.g., on a web browser or other computer application, a store employee's handheld device, multiple ESLs, a price check station, a point-of-sale, etc.) may require coordination and network communication, there may be situations when a price update is not received and processed by a device that may present the price, so that device may not provide the most updated price at a given time, and may present a different price for the product as another price displayed for the same product within a physical location.

Therefore, there is a need to synchronize the presentation of prices across multiple devices while providing a customer the best price for their visit.

In one or more embodiments, a price of an item may be presented at physical and/or virtual locations. For example, a product's price may be presented by an ESL in a physical location (e.g., a store or merchant location), by portable devices in a physical location, by point-of-sale devices in a physical location, and at other physical places. The product's price also may be presented online (e.g., a virtual location), such as with a website or mobile application (e.g., using a product page). A computer system may listen for price updates to prices presented using a virtual location. When the computer system receives a price update for a product, the computer system may update the price of the product in a backend cache (e.g., in a network cloud-based database). In particular, the computer system may generate a table entry for a database, the table entry including one or more identifiers of the product, one or more identifiers of the physical location where the product is sold (e.g., a store or merchant identifier), one or more prices for the product (e.g., a regular/non-member/non-subscriber price and a preferred customer/subscriber/member price), the time at which the price update occurred, and the like.

In one or more embodiments, when the computer system identifies a price update for a virtual price (e.g., online price), the computer system may call an application programming interface (API), and may serialize any price updates before sending the price updates using the API call. The computer system may verify that a price update reflects the latest price based on the times of previous price updates (e.g., as indicated by table entries that include product prices at given times). The computer system may determine whether a price update represents a price increase or price decrease from one or more prices within a threshold amount of time (e.g., one hour from the time that the price update is received).

In one or more embodiments, the computer system may compare the price update to a previous price (or there may be two prices - regular price and a subscriber price), and when one or multiple of the new prices are lower than respective previous prices, the price update may represent a price decrease, and the computer system may call the API using the price decrease so that the price decrease may be pushed to any electronic price displays (e.g., ESLs, points-of-sale, etc.). A point-of-sale may charge the lowest price for the product (e.g., may display the lowest price at a cash register, deduct the lowest price from a user's account, etc.), whether that price is displayed in a physical location (e.g., a store) or a virtual location (e.g., online). In this manner, the charged price for a product may be different from one or more displayed (e.g., advertised) prices shown by a price display.

In one or more embodiments, when the price update represents a price increase, the computer system may indicate in the API call that a point-of-sale should use the lowest price for the product displayed by any ESL or other price display at a physical location (e.g., in a store). In this manner, the customer may be guaranteed to pay the lowest possible price (e.g., the lowest displayed price), and the computer system may not update (e.g., endorse) an increased price to be charged for a product until the computer system receives a confirmation that price displays (e.g., advertised prices displayed by a price display) have been updated (e.g., the physical price displays at a store have been updated to reflect the updated, increased price). The computer system may update a higher price in the database using a table entry once the higher price has been adopted by devices at a physical location, and may update a lower price immediately. The computer system may use one or more API calls (e.g., instructions) to facilitate the pushing of the increased price to any devices that present the price, and when the computer system receives confirmation that all price display devices at a physical location have been updated to reflect the increased price, the computer system may endorse the increased price for use at a point-of-sale at the physical location. In this manner, a physical location may not use an increased price until the price display devices at the physical location have been updated with the increased price, thereby ensuring that a customer is not charged a higher price at checkout than what the customer may have seen (e.g., an advertised price) at the physical location prior to checkout. Similarly, the price increase might not be used at the physical location point of sale system until a period of time after the display was changed, to ensure that users in the store while the price was changed do not receive the increased price at checkout.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for synchronizing presentation across multiple devices, in accordance with one or more example embodiments of the present disclosure.

Referring to FIG. 1, the system 100 may, at step 102, include a user 104 (e.g., a customer) who may be shopping for items (e.g., Item A, Item B, Item C, Item D, Item E, Item F, Item G, etc.) on a shelf 106 (e.g., of a physical retailer location). The prices for the items on the shelf may be presented digitally (e.g., using ESLs, such as ESL 107, with e-ink or other digital presentation). As shown, the displayed price of Item C in the physical location may be $3.39, which may be consistent with the price presented virtually (e.g., with an online system 108). At step 110, the user 104 may have left the shelf 106 and may be elsewhere in the physical location (e.g., on the way to the point-of-sale 112). After the user 104 has left the shelf 106, the virtual price of Item C may update to $4.39, meaning that the user 104 may see the updated price of Item C if the user 104 accessed a product page for the Item C using a web browser or other application. At step 114, the user 104 may reach the point-of-sale 112 to check out and purchase the Item C and any other items. A cashier 116 or other employee may process the transaction, and the displayed price at the point-of-sale 112 may be the price used by the online system 108 (e.g., a price of $4.39). As such, the displayed price at the point-of-sale 112 may be different (e.g., higher) than the price that the user 104 saw presented at the shelf 106.

Still referring to FIG. 1, to avoid the higher price used by the online system 108 being displayed by the point-of-sale 112 rather than the lowest displayed price seen by the user 104 (e.g., by an ESL at the shelf 106), the displayed prices may be synchronized across multiple devices. At step 120, the user 104 may be shopping for items on the shelf 106 (e.g., of a physical retailer location). The prices for the items on the shelf may be presented digitally (e.g., using ESLs with e-ink or other digital presentation). As shown, the displayed price of Item C in the physical location may be $3.39, which may be consistent with the price presented virtually (e.g., with an online system 108). At step 130, the user 104 may have left the shelf 106 and may be elsewhere in the physical location (e.g., on the way to the point-of-sale 112). After the user 104 has left the shelf 106, the virtual price of Item C may update to $4.39, meaning that the user 104 may see the updated price of Item C if the user 104 accessed a product page for the Item C using a web browser or other application. At step 140, the user 104 may reach the point-of-sale 112 to check out and purchase the Item C and any other items. A cashier 116 or other employee may process the transaction, and the displayed price at the point-of-sale 112 may be the lowest price available for the Item C (e.g., the $3.39 price displayed at the shelf 106) due to price display synchronization across multiple devices to guarantee that the user 104 is charged the lowest price possible for the Item C. In this manner, at step 140, the user 104 may not have to pay the increased price used by the online system 108 (e.g., the price increase from the displayed $3.39 price of Item C from step 120 when the user 104 was in front of the shelf 106 to the online system price 108 of $4.39 after the user 104 has moved on from the shelf 106) when the user 104 may not have seen any display of the higher price of $4.39 before checkout. At step 140, the user 104 may not be presented with or charged the price used by the online system 108 for Item C even though the price of Item C may have increased during the time between step 120 and step 140. Once the shelf 106 or any other physical displays of the price for Item C have been updated to replace presentation of the $3.39 price with presentation of the $4.39 price, then the point-of-sale 112 may present and charge the user 104 the increased price. Alternatively, the point-of-sale 112 may present and charge the user 104 the increased price only after a time has passed since the shelf 106 or any other physical displays of the price for Item C have been updated to replace presentation of the $3.39 price with presentation of the $4.39 price. The price displayed at the shelf 106 may refer to an advertised price, and the price charged at the point-of-sale 112 may or may not reflect the advertised price.

Figure 2:
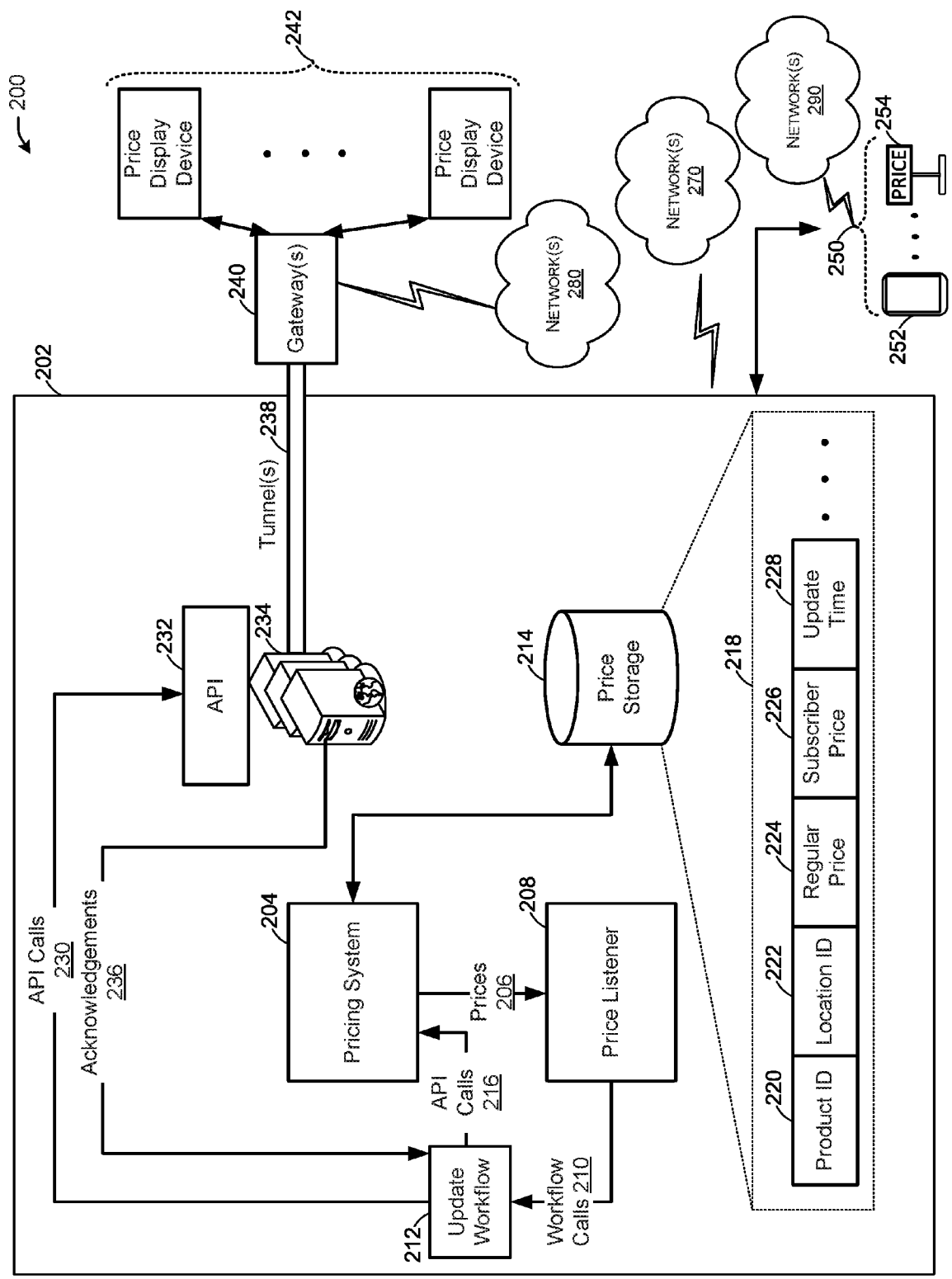
FIG. 2 illustrates a system for synchronizing presentation across multiple devices, in accordance with one or more example embodiments of the present disclosure.

In one or more embodiments, a computer system (e.g., as shown in FIG. 2) may compare the price update for Item C (e.g., in the online system 108) to a previous price (e.g., the Item C prices displayed at the shelf within a recent time period), and when one or multiple of the updated prices are lower than respective previous prices, the price decrease may be pushed to any electronic price displays (e.g., ESLs at the shelf 106, the point-of-sale 112, etc.). For example, at step 130, when the price of Item C used by the online system 108 decreases from step 120, the point-of-sale 112 may charge the lowest price for the Item C (e.g., may display the lowest price at the cash register, deduct the lowest price from a user's account, initiate a transaction using the lowest price, etc.). In one example, when the lowest price is displayed by an in-store ESL (e.g., as shown at the shelf 106), the point-of-sale 112 may process the Item C at the lowest price even when the price for the Item C is listed anywhere else as a higher price (e.g., because the presented price updated while the user 104 was in the physical location and/or because the presented price does not reflect the price used by the online system 108 due to a network/communication error or otherwise).

In one or more embodiments, when the price update represents a price increase, the computer system (e.g., as shown in FIG. 2) may instruct the point-of-sale 112 to use the lowest price for the product displayed by any ESL or other price display at a physical location (e.g., in a store). In this manner, the user 104 may be guaranteed to pay the lowest possible price (e.g., the lowest displayed price), and the computer system may not update (e.g., endorse and push to any price displays at a physical location) an increased price for a product until the computer system receives a confirmation that price displays have been updated (e.g., the physical price displays at a store have been updated to reflect the updated, increased price shown online). Similarly, the price increase might not be used at the point-of-sale 112 until a period of time after one or more displays were changed, to ensure that the user 104 in the store while the price was changed does not receive the increased price at checkout.

FIG. 2 illustrates a system 200 for synchronizing presentation across multiple devices, in accordance with one or more example embodiments of the present disclosure.

Referring to FIG. 2, the system 200 may include a computer system 202 (e.g., a network- or cloud-based computer system) that may include a pricing system 204 (e.g., which may serve as a price authority for multiple items and services). The pricing system 204 may receive prices 206 (e.g., price updates, such as when a price used by the online system 108 of FIG. 1 changes) and may include logic for determining prices of items. For example, when a subscriber price is within a threshold amount of a regular price, the pricing system 204 may endorse one of the two prices for display. The pricing system 204 may receive the prices 206 from a daemon or otherwise, and may determine the price to be presented (e.g., using the ESL 107 of FIG. 1) based on a set of pricing display rules. The computer system 202 may include a price listener that may listen for the prices 206, which the pricing system 204 may include in messages. When the price listener 208 identifies the prices 206 (e.g., price updates), the price listener 208 may make one or more workflow calls 210 (e.g., may transmit one or more instructions) to an update workflow 212 (e.g., one or more modules) to initiate a workflow. The pricing system 204 may generate a table entry in a price storage 214 (e.g., database or other storage) that indicates an updated price, a product to which the update price applies, the time when the price update occurs, and other information as explained further below. The update workflow 212 may make API calls 216 (e.g., may transmit one or more instructions) to the pricing system 204 requesting price data stored in the price storage 214 so that the update workflow 212 may verify that a price update reflects the most update price for a given product (e.g., to minimize the number of price updates pushed to displays as explained further below, and to ensure that the most updated prices are pushed to displays).

Still referring to FIG. 2, the update workflow 212 may compare a price update to an old price for a product having the same one or more product identifiers. For example, a table entry 218 may include price update information such as a product identifier 220, a location identifier 222 (e.g., identifying a physical location and/or retailer), a regular price 224 (e.g., a non-member, non-subscriber price, or non-discounted price), a subscriber price 226 (e.g., a member price or discounted price), an update time 228 (e.g., a time when the price update occurred for the product), and the like. The update workflow 212 may identify table entries having the product identifier 220 within a given time period (e.g., within an hour from the current time, based on the update time 228 entries). The update workflow 212 may compare the respective update time 228 entries to determine the most updated price for a product having the product identifier 220. If at least one of the regular price 224 or the subscriber price 226 has decreased, the update workflow 212 may make one or more API calls 230 (e.g., may transmit one or more instructions) to an API 232 associated with one or more ESL servers 234. When a price update represents a price decrease for a product, the one or more API calls 230 may indicate an endorsement of the lower price, and the one or more API calls 216 may indicate the endorsed lower price to the pricing system 204. When a price update represents a price increase for a product, the update workflow 212 may indicate the price increase in the one or more API calls 230, and the update workflow 212 may wait to receive one or more acknowledgements 236 from the one or more ESL servers 234 indicating that the displayed price (e.g., the price used by one or more devices as explained further below) has been updated (e.g., synchronized) across multiple devices (and possibly may wait an additional time period). When the price update represents a price increase for a product and the update workflow 212 receives the one or more acknowledgements 236, the update workflow 212 may endorse the price increase and confirm the endorsement using the one or more API calls 216 to the pricing system 204. The API calls described herein may indicate prices, endorsements, requests, and the like via API call payloads, and also may be referred to as instructions, requests, responses, and the like.

Still referring to FIG. 2, the one or more ESL servers 234 may use a tunneled communication (e.g., tunnel 238) to communicate with one or more gateways 240. The tunnel 238 may be generated on-demand by one or more price display devices 242 controlled by the one or more gateways 240. The tunnel 238 may use transport layer security (TLS) for cryptographic protection and for authentication.

Once a reverse-proxy is established using the tunnel 238 (e.g., via TLS), the connection to a gateway of the one or more gateways 240 may be established. The one or more gateways 240 may be intermediary devices that relay price updates and other product information to the one or more price display devices 242 (e.g., tags, ESLs, points-of-sale, and other devices/locations that present product information such as pricing). The one or more gateways 240 may push the price updates to the one or more price display devices 242 (e.g., the ESL 107 of FIG. 1) based on the price updates received in the one or more API calls 230 and sent to the one or more gateways 240 using the tunnel 238. The one or more gateways 240 may be able to initiate communication with the one or more ESL servers 234 in the computer system 202. The one or more gateways 240 may be deployed in a segregated subnetwork within a network (e.g., an in-store network) isolated from other subnetworks. The one or more ESL servers 234 may reside in a virtual private network, and the one or more gateways 240 may be physically located in a physical location such as a store.

Still referring to FIG. 2, one or more devices 250 (e.g., user device 252 and point-of-sale device 254) may use the endorsed price for a product. For example, the user device 252 may see an endorsed price when browsing products using an online application. The point-of-sale device 254 may use an endorsed price for product checkout. In this manner, when a virtual price changes compared to prices displayed by the one or more price display devices 242 at a given physical location (e.g., corresponding to the location identifier 222), the price displayed by the one or more price display devices 242 may be updated to present the latest price, but the point-of-sale device 254 may not use the updated price until that price has been endorsed. The computer system 202 may wait for a time period (e.g., thirty minutes, forty-five minutes, an hour, ninety minutes, etc.) after a price changes before endorsing the price for use by the one or more devices 250. The computer system 202 may "look back" over the time period preceding the detected price change for an item, and may confirm whether the price increased or decreased again. The endorsed price may be the lowest price of the product displayed by the one or more price display devices 242 at a physical location corresponding to the location identifier 222.

In one or more embodiments, a price of an item may be presented at physical locations (e.g., the one or more price display devices 242) and/or virtual locations (e.g., online via one or more applications). For example, a product's price may be presented by an ESL (e.g., the ESL 107 of FIG. 1) in a physical location (e.g., a store or merchant location), by portable devices in a physical location, by point-of-sale devices in a physical location, and at other physical places (e.g., using the one or more price display devices 242). The product's price also may be presented online (e.g., a virtual location), such as with a website or mobile application (e.g., using a product page). The computer system 202 may listen for price updates to prices presented using a virtual location. When the computer system 202 receives a price update for a product, the computer system 202 may update the price of the product in the price storage 214. In particular, the computer system 202 may generate the table entry 218 for the price storage 214.

In one or more embodiments, when the computer system 202 identifies a price update for a virtual price (e.g., online price), the computer system 202 may verify that a price update reflects the latest price based on the times of previous price updates. The computer system 202 may determine whether a price update represents a price increase or price decrease from one or more prices within a threshold amount of time (e.g., one hour from the time that the price update is received).

In one or more embodiments, the computer system 202 may compare (e.g., using table entries) the price update to a previous price (or there may be two prices - regular price and a subscriber price), and when one or multiple of the new prices are lower than respective previous prices, the price update may represent a price decrease, and the computer system may make the one or more API calls 230 to indicate the price decrease so that the price decrease may be pushed by the one or more ESL servers 234 to the one or more gateways 240 (e.g., based on the location identifier 222 of a price increase) to any of the one or more price display devices 242 controlled by the one or more gateways 240. A point-of-sale (e.g., one of the price display devices 242) may charge the lowest price for the product (e.g., may display the lowest price at a cash register, deduct the lowest price from a user's account, initiate a transaction using the lowest price, etc.), whether that price is displayed (e.g., advertised) in a physical location (e.g., a store) or a virtual location (e.g., online).

In one or more embodiments, when the price update represents a price increase, the computer system 202 may indicate in the one or more API calls 230 that the one or more price display devices 242 should use the lowest price for the product displayed by any ESL or other price display at a physical location (e.g., in a store). In this manner, a customer may be guaranteed to pay the lowest possible price (e.g., the lowest displayed price), and the computer system 202 may not update (e.g., endorse) an increased price for a product until the computer system 202 receives a confirmation (e.g., the one or more acknowledgements 236) that the one or more price display devices have been updated (e.g., the physical price displays at a store have been updated to reflect the updated, increased price). The computer system 202 may update a higher price in the price storage 214 using the table entry 218 once the higher price has been adopted by the one or more price display devices 242 at a physical location, and may update a lower price immediately. The computer system 202 may wait an additional time after receiving the confirmation before allowing the increased price to be charged at the physical location. In this manner, the price charged at a point-of-sale (e.g., a checkout station or cash register, an automatic transaction, such as when a customer leaves a retailer, etc.) may be different than an advertised price displayed by an ESL or other price display.

In one or more embodiments, when the update workflow 212 does not receive the one or more acknowledgements 236 indicating that the one or more price display devices 242 have been updated with the most recent and lowest available price, the pricing system 204 may enter a timeout state. The pricing system 204 may generate a list of the one or more price display devices 242 that were not updated properly, and the computer system 202 may send the list to the one or more gateways 240 or to other devices to notify retailers that the one or more price display devices 242 are not functioning properly.

In one or more embodiments, the computer system 202 may map addresses, such as a medium access control (MAC) address, or the one or more price display devices 242 to the location identifier 222 to determine which of the one or more price display devices 242 is to receive a price update. Because the respective address of the one or more price display devices 242 may be unique to the device, the price updates sent to the one or more price display devices 242 may be a unicast transmission, and the one or more acknowledgements 236 may identify any respective device of the one or more price display devices. In this manner, the computer system 202 may determine, based on the one or more acknowledgements 236, which of the one or more price display devices 242 was updated, and from which of the one or more price display devices 242 the computer system 202 did not receive an acknowledgement (e.g., which of the one or more price display devices 242 were not updated properly).

In one or more embodiments, the one or more ESL servers 234 may provide the price updates to the one or more gateways 240 in the form of an image. For example, the one or more gateways 240 may send digital images that identify the product and one or more prices for the product (e.g., based on the product identifier 220, the regular price 224, and the subscriber price 226). The one or more price display devices 242 may display the image as a digital output (e.g., a price tag that identifies the real-time price of a product). The image displayed by the one or more price display devices 242 may indicate one or multiple prices for a product. For example, a single price is shown by the ESL 107 in FIG. 1, but the one or more price display devices 242 may display both the regular price 224 and the subscriber price 226. The image data provided to the one or more gateways 240 from the one or more ESL servers 234, and from the one or more gateways 240 to the one or more price display devices 242, may indicate one or more price changes. For example, when a price displayed by the one or more price display devices 242 is to be replaced by an updated price, the one or more API calls 230 will indicate such a change, and the one or more ESL servers 234 will indicate the change to the one or more gateways 240 so that the one or more gateways 240 may instruct the one or more price display devices 242 to replace image data for display, the image data indicating product information that may include the price(s). When the one or more API calls 230 indicate that there is no price change for one or multiple prices displayed by the one or more price display devices 242, the one or more ESL servers 234 may not need to send any updates to the one or more gateways 240, but when any one of multiple prices displayed by the one or more price display devices 242 changes, the one or more ESL servers 234 may notify the one or more gateways 240 of the changes, to which price(s) the change applies, and which of the one or more price display devices 242 should receive updated image data to present the updated price(s).

In one or more embodiments, the one or more price display devices 242 may include an ESL (e.g., the ESL 107 of FIG. 1), a handheld device for identifying products and their prices, a price check station device, a point-of-sale device (e.g., the point-of-sale 112 of FIG. 1), and the like. The one or more price display devices 242 may use electronic ink (e-ink) for presenting production information such as product prices.

In one or more embodiments, different physical locations (e.g., as indicated by the location identifier 222) may have different respective gateways of the one or more gateways 240. For example, a first physical location may have one or more gateways that control one or more price display devices, and a second physical location may have a different one or more gateways that control a different one or more price display devices. The updating of the one or more price display devices 242 may be location-specific, meaning that the price updates sent to the one or more gateways 240 for the one or more price display devices 242 may be specific to the location of the one or more gateways 240 and the one or more price display devices 242 (e.g., the physical location corresponding to the location identifier 222). In this manner, the process of comparing price updates to previously presented prices at a given physical location and updating prices at the physical location may be specific to the physical location corresponding to the location identifier 222. The same process of updating prices for a product may be repeated for different locations corresponding to the location identifier 222.

In one or more embodiments, while the price storage 214 may store the table entry 218 indicating product prices at a given location, other methods of storing and retrieving product price information may be used by the computer system 202. For example, the price storage 214 may include a queue, a node tree or other mapping of prices, a price buffer, one or more modules or methods for identifying a price (e.g., using quantum computing, machine learning, or the like).

The computer system 202 may be configured to communicate via a communications network 270, the one or more gateways 240 may be configured to communicate via a communications network 280, and the one or more devices 250 may be configured to communicate via the communications network 290, wirelessly or wired (e.g., the same or different wireless communications networks). The communications network 270, the communications network 280, and/or the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270, the communications network 280, and/or the communications network 290 may have any suitable communication range associated therewith and may include, for example, global networks (e.g., the Internet), metropolitan area networks (MANs), wide area networks (WANs), local area networks (LANs), or personal area networks (PANs). In addition, communications network 270, the communications network 280, and/or the communications network 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The computer system 202, the one or more gateways 240, the one or more price display devices 242, and/or the one or more devices 250 may include any suitable processor-driven device including, but not limited to, a mobile device or a non-mobile, e.g., a static, device. For example, the computer system 202, the one or more gateways 240, and/or the one or more price display devices 242 may include a user equipment (UE), a station (STA), an access point (AP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 3:
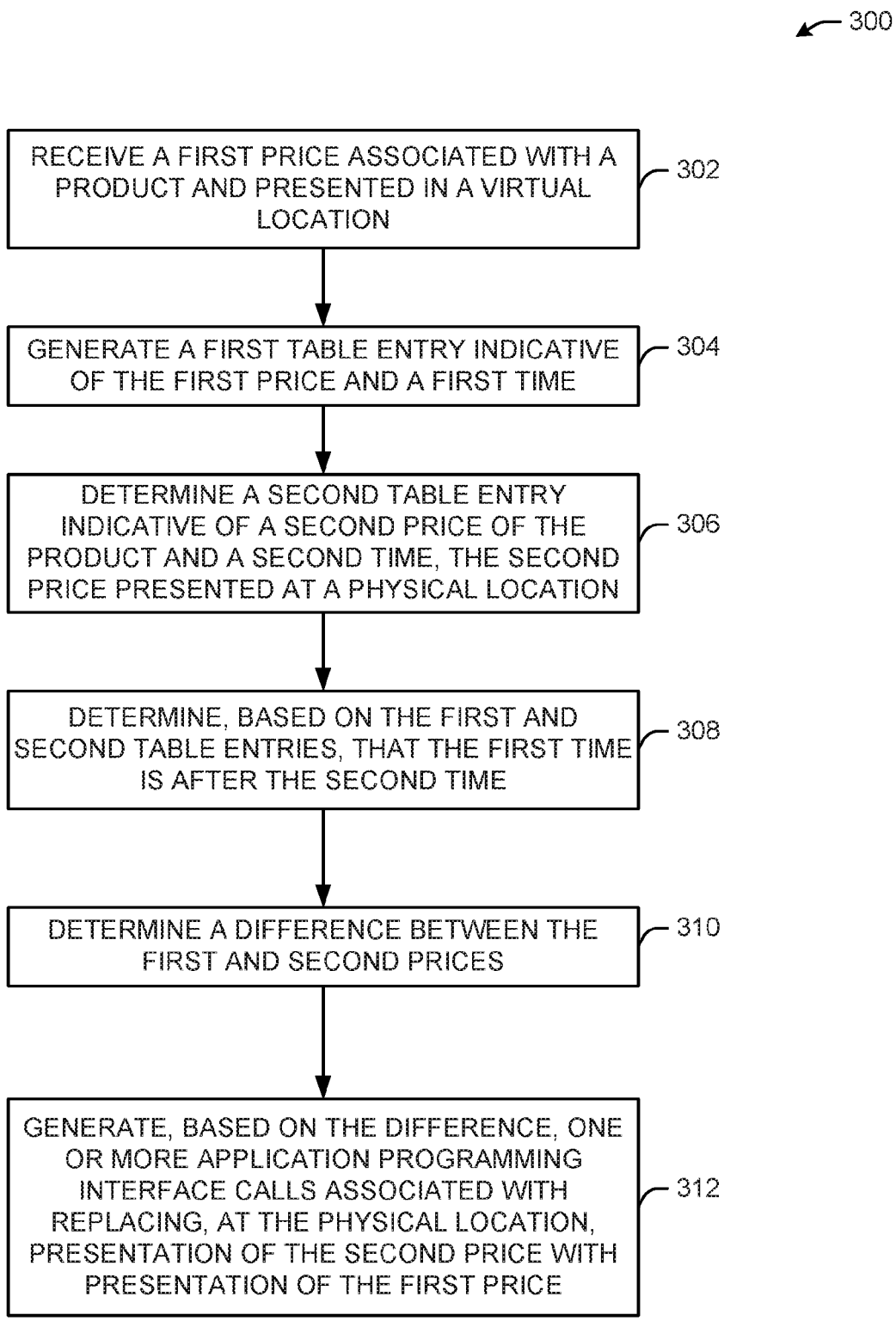
FIG. 3 illustrates a process for synchronizing presentation across multiple devices, in accordance with one or more example embodiments of the present disclosure.

FIG. 3 illustrates a process 300 for synchronizing presentation across multiple devices, in accordance with one or more example embodiments of the present disclosure.

At block 302, a system (or device, e.g., the computer system 202 of FIG. 2) may receive a first price (e.g., the prices 206 of FIG. 2) associated with a product (e.g., Item C of FIG. 1). The first price may be presented in a virtual location (e.g., online, such as the price used by the online system 108 of FIG. 1). The product may be sold at one or more physical and/or virtual locations. Within a physical location, there may be multiple devices and displays of one or more prices of the product. For example, ESLs, price tags, signs, price checks, and points-of-sale may indicate one or more prices (e.g., the regular price 224 and/or the subscriber price 226 of FIG. 2) for the product at a given time. The virtual price may vary over time, and the physical location price displays (e.g., using the one or more price display devices 242 of FIG. 2) may reflect the virtual price of the product.

At block 304, the system may generate a first table entry (e.g., the table entry 218 of FIG. 2) indicative of the first price and a first time (e.g., the update time 228 of FIG. 2). The first time may be the time at which the system identifies the first price. The first table entry may be one of multiple table entries that indicate one or more prices for a product at one or more locations. Any table entry may indicate the one or more prices of a product at a given time so that the system may identify the most recent price updates for a product at any location. For example, the system may avoid endorsing price updates that are outdated by comparing table entries within a time period (e.g., an hour or less from the current time).

At block 306, the system may determine a second table entry indicative of a second price of the product at a second time. For example, the second table entry may be stored (e.g., as the table entry 218 in the price storage 214) among multiple table entries that may identify the product, locations where the product is sold, and one or more prices at which the product is available for sale at given times. The second table entry may indicate prices displayed at one or more physical locations (e.g., using the one or more price display devices 242 of FIG. 2).

At block 308, the system may determine, based on the first and second table entries, that the first time is after the second time. Using the times of the table entries, the system may determine that the first price is a price update from the second price because the first price has the first time, and the first time is after the second time at which the second price for the product is used. In this manner, the system may compare table entries for a given product and location, and may avoid sending price updates to reflect the first price of the product when the first price is not the most recent price for the product. For example, the system may receive multiple prices for the product during a given time period, so the first price may be outdated. However, when the first price reflects the most recent price for the product at a location, the system may evaluate whether to update a price display for the product.

At block 310, the system may determine a difference between the first and second prices. For example, when the first and second prices are the same, there may be no reason to replace a presentation of the second price presented for the product at a physical location with the first price even when the first price is more recent than the second price. However, when the first price is more recent than the second price and exceeds a threshold difference from the second price, the system may facilitate the replacement of the second price with the first price at any location.

At block 312, the system may generate, based on the price difference, one or more API calls (e.g., may transmit one or more instructions) associated with replacing presentation of (e.g., at the one or more price display devices 242 of FIG. 2) the second price with presentation of the first price at a physical location. Even when the product has multiple prices displayed concurrently, such as a regular price and a subscriber price, the one or more API calls may indicate the updated price and the maintained price so that update pricing data may be presented. The one or more API calls may include API calls to an API (e.g., the API 232 of the one or more ESL servers 234 of FIG. 2), in which the payload of the API calls may indicate one or more prices of the product to be presented, at which locations, and at specific display devices (e.g., identified by a MAC address or other identifier of the display devices). When the price difference between the first and second prices represents a price decrease, the system may endorse the lower price and indicate the endorsement with another one or more API calls (e.g., the API calls 216 of FIG. 2) that indicate to the system that the first price is the currently used price for the product at a given location. When the price difference between the first and second prices represents a price increase, the system may wait to endorse the higher price (e.g., by using one or more API calls to indicate the endorsement). For example, the system may wait to receive one or more acknowledgements (e.g., the one or more acknowledgements 236 of FIG. 2), the one or more acknowledgements indicating the specific price display devices that were updated to present the first price (e.g., by replacing the second price with the first price). Once the system receives an acknowledgment, the system may endorse the price increase. In this manner, the system may verify that all ESLs and other price display devices have been updated with a price increase before notifying a point-of-sale device to use the increased price, thereby preventing the point-of-sale device from charging a price that is higher than any price displayed by an ESL or other price display device within a physical location. For example, the system may make an API call associated with replacing a price used by a point-of-sale device when the system recognizes a price decrease for a product, but the system may refrain from making an API call associated with replacing a price used by a point-of-sale device when the system recognizes a price increase for a product (e.g., until receiving one or more acknowledgements that relevant price display devices have been updated with the increased price). When a price update is a price increase, the system may instruct a point-of-sale device to display the highest price of the prices of the product displayed at the physical location so that a customer is not charged a higher price than what they may have seen at the physical location (e.g., so that the customer is not charged an online price that is higher than what is displayed in a store).

In one or more embodiments, the process 300 may be repeated for multiple locations (e.g., based on the location identifier 222 of FIG. 2). For example, block 306 may depend on a physical location for a product. The system may identify the product and, for a given physical location, may determine the second table entry. The second table entry may be different at another physical location where the product is sold.

Figure 4:
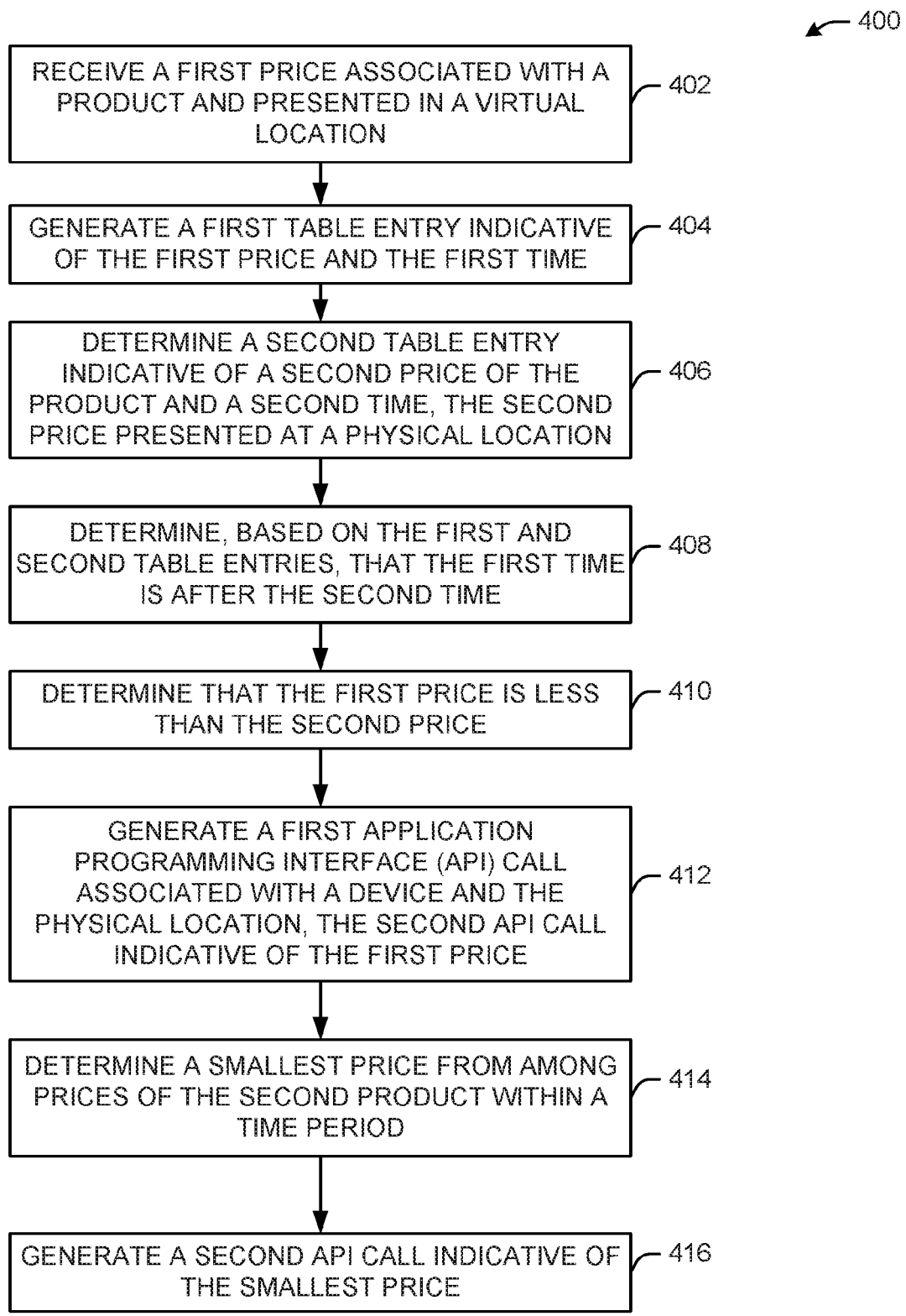
FIG. 4 illustrates a process for synchronizing presentation across multiple devices, in accordance with one or more example embodiments of the present disclosure.

FIG. 4 illustrates a process 400 for synchronizing presentation across multiple devices, in accordance with one or more example embodiments of the present disclosure.

At block 402, a system (or device, e.g., the computer system 202 of FIG. 2) may receive a first price (e.g., the prices 206 of FIG. 2) associated with a product (e.g., Item C of FIG. 1). The first price may be presented in a virtual location (e.g., online, such as the price used by the online system 108 of FIG. 1). The product may be sold at one or more physical and/or virtual locations. Within a physical location, there may be multiple devices and displays of one or more prices of the product. For example, ESLs, price tags, signs, price checks, and points-of-sale may indicate one or more prices (e.g., the regular price 224 and/or the subscriber price 226 of FIG. 2) for the product at a given time. The virtual price may vary over time, and the physical location price displays (e.g., using the one or more price display devices 242 of FIG. 2) may reflect the virtual price of the product.

At block 404, the system may generate a first table entry (e.g., the table entry 218 of FIG. 2) indicative of the first price and a first time (e.g., the update time 228 of FIG. 2). The first time may be the time at which the system identifies the first price. The first table entry may be one of multiple table entries that indicate one or more prices for a product at one or more locations. Any table entry may indicate the one or more prices of a product at a given time so that the system may identify the most recent price updates for a product at any location. For example, the system may avoid endorsing price updates that are outdated by comparing table entries within a time period (e.g., an hour or less from the current time).

At block 406, the system may determine a second table entry indicative of a second price of the product at a second time. For example, the second table entry may be stored (e.g., as the table entry 218 in the price storage 214) among multiple table entries that may identify the product, locations where the product is sold, and one or more prices at which the product is available for sale at given times. The second table entry may indicate prices displayed at one or more physical locations (e.g., using the one or more price display devices 242 of FIG. 2).

At block 408, the system may determine, based on the first and second table entries, that the first time is after the second time. Using the times of the table entries, the system may determine that the first price is a price update from the second price because the first price has the first time, and the first time is after the second time at which the second price for the product is used. In this manner, the system may compare table entries for a given product and location, and may avoid sending price updates to reflect the first price of the product when the first price is not the most recent price for the product. For example, the system may receive multiple prices for the product during a given time period, so the first price may be outdated. However, when the first price reflects the most recent price for the product at a location, the system may evaluate whether to update a price display for the product.

At block 410, the system may determine that the first price is less than the second price (e.g., that the price for the product has decreased). At block 412, the system may generate a first API call (e.g., the one or more API calls 230 of FIG. 2) associated with a device (e.g., identifying a price display device at a physical location) and a physical location (e.g., the physical location where the product is sold and where the device is located, such as a store). The first API call may indicate the first price for the product. In this manner, the system may use API calls to instruct another device (e.g., the one or more gateway devices 240 of FIG. 2) to provide updated price data (e.g., in the form of image data) to individually addressed price display devices at a physical location where the product is available for purchase. The API calls may be instructions.

At block 414, the system may determine the smallest price from among prices of the second product within a time period. For example, the system may identify any table entries for a product at any location with time entries that are within a threshold time from the current time. The system may charge the smallest price for the product within the time period regardless of the prices displayed by any price display devices in a physical location, thereby guaranteeing that a customer is charged the lowest possible price for the product, even when the lowest price is not yet displayed at the physical location.

At block 416, the system may generate a second API call (e.g., the one or more API calls 216 of FIG. 2) associated with a field of the first table entry (e.g., a price field) for the product, the first API call indicating the smallest price. The second API call may represent an endorsement of the lowest available price for the product so that points-of-sale devices may use the lowest available price when a customer purchases the product regardless of whether or not any other price display device is not yet presenting the lowest price. Without endorsing the lowest price, points-of-sale devices may not use the lowest price available even while the system is facilitating the updated presentation of prices at other price display devices. Thus, the endorsement of the lowest price may allow the system to instruct points-of-sale devices to use the lowest price over a given time period. The system may look back over a period of time and determine the lowest price displayed at a physical location during the period of time, and the second API call may indicate that price, which may be used at a point-of-sale device. In this manner, the point-of-sale may not update the checkout price every time that a price display device updates the presentation of a price. The API calls may be instructions.

In one or more embodiments, the process 400 may be repeated for multiple locations (e.g., based on the location identifier 222 of FIG. 2). For example, block 406 may depend on a physical location for a product. The system may identify the product and, for a given physical location, may determine the second table entry. The second table entry may be different at another physical location where the product is sold.

Figure 5:
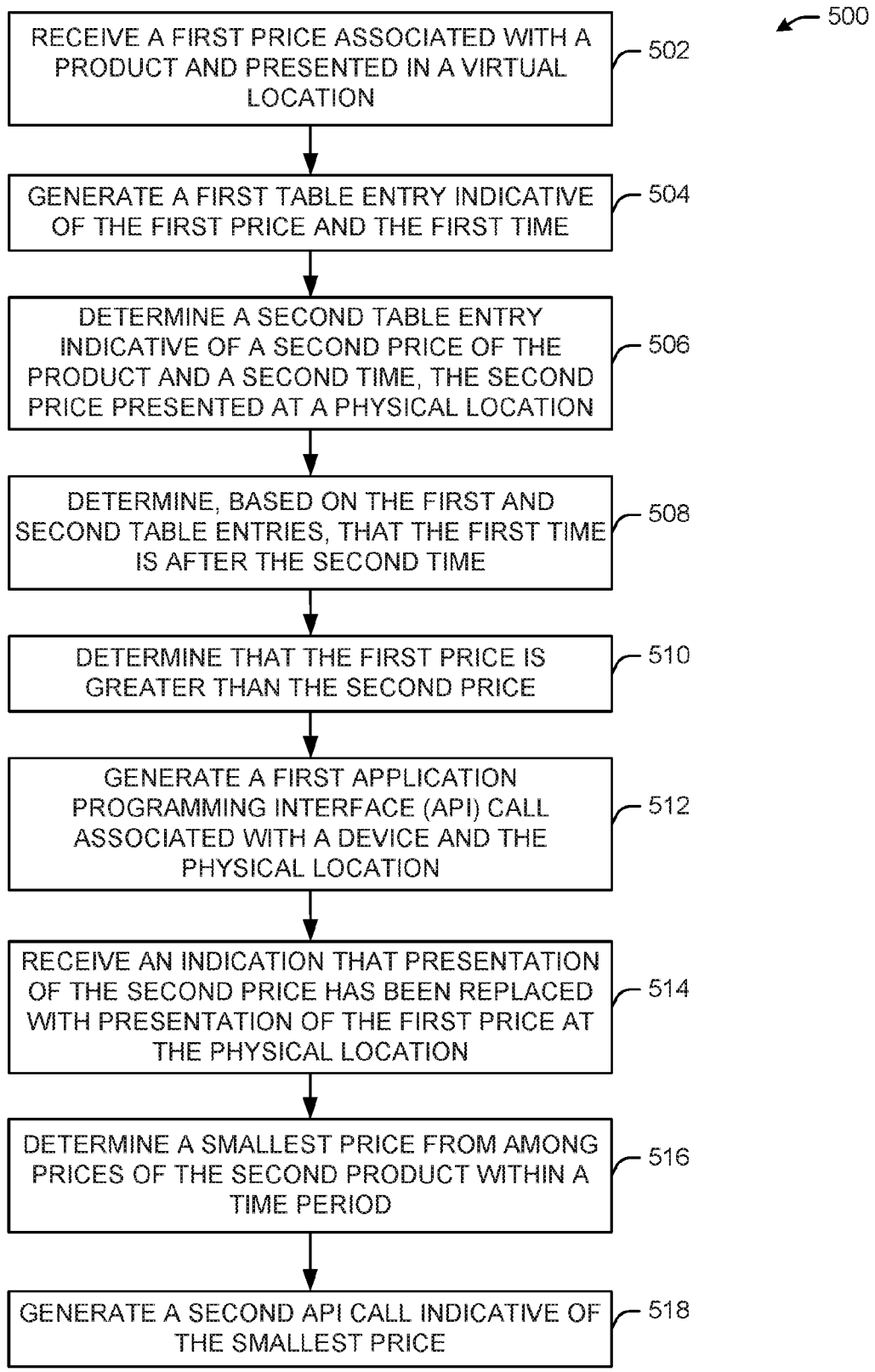
FIG. 5 illustrates a flow diagram for a process for synchronizing presentation across multiple devices, in accordance with one or more example embodiments of the present disclosure.

FIG. 5 illustrates a process 500 for synchronizing presentation across multiple devices, in accordance with one or more example embodiments of the present disclosure.

At block 502, a system (or device, e.g., the computer system 202 of FIG. 2) may receive a first price (e.g., the prices 206 of FIG. 2) associated with a product (e.g., Item C of FIG. 1). The first price may be presented in a virtual location (e.g., online, such as the price used by the online system 108 of FIG. 1). The product may be sold at one or more physical and/or virtual locations. Within a physical location, there may be multiple devices and displays of one or more prices of the product. For example, ESLs, price tags, signs, price checks, and points-of-sale may indicate one or more prices (e.g., the regular price 224 and/or the subscriber price 226 of FIG. 2) for the product at a given time. The virtual price may vary over time, and the physical location price displays (e.g., using the one or more price display devices 242 of FIG. 2) may reflect the virtual price of the product.

At block 504, the system may generate a first table entry (e.g., the table entry 218 of FIG. 2) indicative of the first price and a first time (e.g., the update time 228 of FIG. 2). The first time may be the time at which the system identifies the first price. The first table entry may be one of multiple table entries that indicate one or more prices for a product at one or more locations. Any table entry may indicate the one or more prices of a product at a given time so that the system may identify the most recent price updates for a product at any location. For example, the system may avoid endorsing price updates that are outdated by comparing table entries within a time period (e.g., an hour or less from the current time).

At block 506, the system may determine a second table entry indicative of a second price of the product at a second time. For example, the second table entry may be stored (e.g., as the table entry 218 in the price storage 214) among multiple table entries that may identify the product, locations where the product is sold, and one or more prices at which the product is available for sale at given times. The second table entry may indicate prices displayed at one or more physical locations (e.g., using the one or more price display devices 242 of FIG. 2).

At block 508, the system may determine, based on the first and second table entries, that the first time is after the second time. Using the times of the table entries, the system may determine that the first price is a price update from the second price because the first price has the first time, and the first time is after the second time at which the second price for the product is used. In this manner, the system may compare table entries for a given product and location, and may avoid sending price updates to reflect the first price of the product when the first price is not the most recent price for the product. For example, the system may receive multiple prices for the product during a given time period, so the first price may be outdated. However, when the first price reflects the most recent price for the product at a location, the system may evaluate whether to update a price display for the product.

At block 510, the system may determine, based on the table entries, that the first price is greater than the second price. The system may compare multiple prices for a product at any location. For example, the regular price of the product may change, but the subscriber price may stay the same. The subscriber price of the product may change, but the regular price may stay the same. Both the regular and subscriber prices may change, or both the regular and subscriber prices may stay the same. When any one of the prices for a product at a location changes, the system may facilitate a price display update. When the first price represents a price increase from the second price, the system may facilitate updating displayed prices at a physical location before endorsing the increased price for use at a point-of-sale device at the physical location so that the physical location point-of-sale device does not charge a customer a higher price than what the customer may have seen at the physical location (e.g., the price of a product displayed on a shelf with an ESL).

At block 512, the system may generate a first API call (e.g., the one or more API calls 230 of FIG. 2) associated with a device (e.g., identifying a price display device at a physical location) and a physical location (e.g., the physical location where the product is sold and where the device is located, such as a store). The second API call may indicate that presentation of the second price is to be replaced at one or more price display devices with presentation of the first price. In this manner, the system may use API calls to instruct another device (e.g., the one or more gateway devices 240 of FIG. 2) to provide updated price data (e.g., in the form of image data) to individually addressed price display devices at a physical location where the product is available for purchase. The system may wait to confirm that any price display devices at a location have been updated to present the first price before endorsing the first price for use by points-of-sale. The first API call may be an instruction.

At block 514, the system may receive an indication (e.g., the one or more acknowledgements 236 of FIG. 2) that presentation of the second price at one or more price display devices at the physical location have been replaced with presentation of the first price at the physical location. For example, ESLs, price check devices, and other price displays at the physical location may provide indications that they have implemented the presentation of new image data that includes the first price. In this manner, the system may identify which price display devices have updated presentation of product pricing information, and which display devices have not. Using the location identifier of table entries for a physical location where the product is sold, the system may confirm that there are no outstanding price displays for the product at the physical location that present the second price or a lower price than the first price before the system endorses the first price for use. In this manner, the system may ensure that a customer at the physical location is charged only the highest displayed price at the physical location, even if the first price represents a price increase from that highest displayed price at the physical location. Customer experience may be improved by avoiding the charging of a higher price for a product at checkout than the price seen by the customer before checkout.

At block 516, the system may determine the smallest price from among prices of the second product within a time period. For example, the system may identify any table entries for a product at any location with time entries that are within a threshold time from the current time. The system may charge the smallest price for the product within the time period regardless of the prices displayed by any price display devices in a physical location, thereby guaranteeing that a customer is charged the lowest possible price for the product, even when the lowest price is not yet displayed at the physical location.

At block 518, the system may generate a second API call (e.g., the one or more API calls 216 of FIG. 2) indicating endorsement of the smallest price from the time period evaluated at block 516. The second API call may represent an endorsement of the smallest available price for the product to be presented by a device (e.g., the point-of-sale device 254 of FIG. 2) at a given physical location. When a product price increases over time, points-of-sale devices at the physical location may use an increased price only when physical location price displays have replaced presentation of a lower displayed price with the higher first price, and may not use the increased price until the system confirms that the price has not lowered again during a given time period. Without endorsing the first price, points-of-sale devices may not use the first price available even while the system is facilitating the updated presentation of prices at other price display devices. Thus, the endorsement of the first price may allow the system to instruct points-of-sale devices to use the first price only after price displays at a physical location have been updated to present the higher first price. The second API call may be an instruction.

In one or more embodiments, the process 500 may be repeated for multiple locations (e.g., based on the location identifier 222 of FIG. 2). For example, block 506 may depend on a physical location for a product. The system may identify the product and, for a given physical location, may determine the second table entry. The second table entry may be different at another physical location where the product is sold.

These examples are not meant to be limiting.

Figure 6:
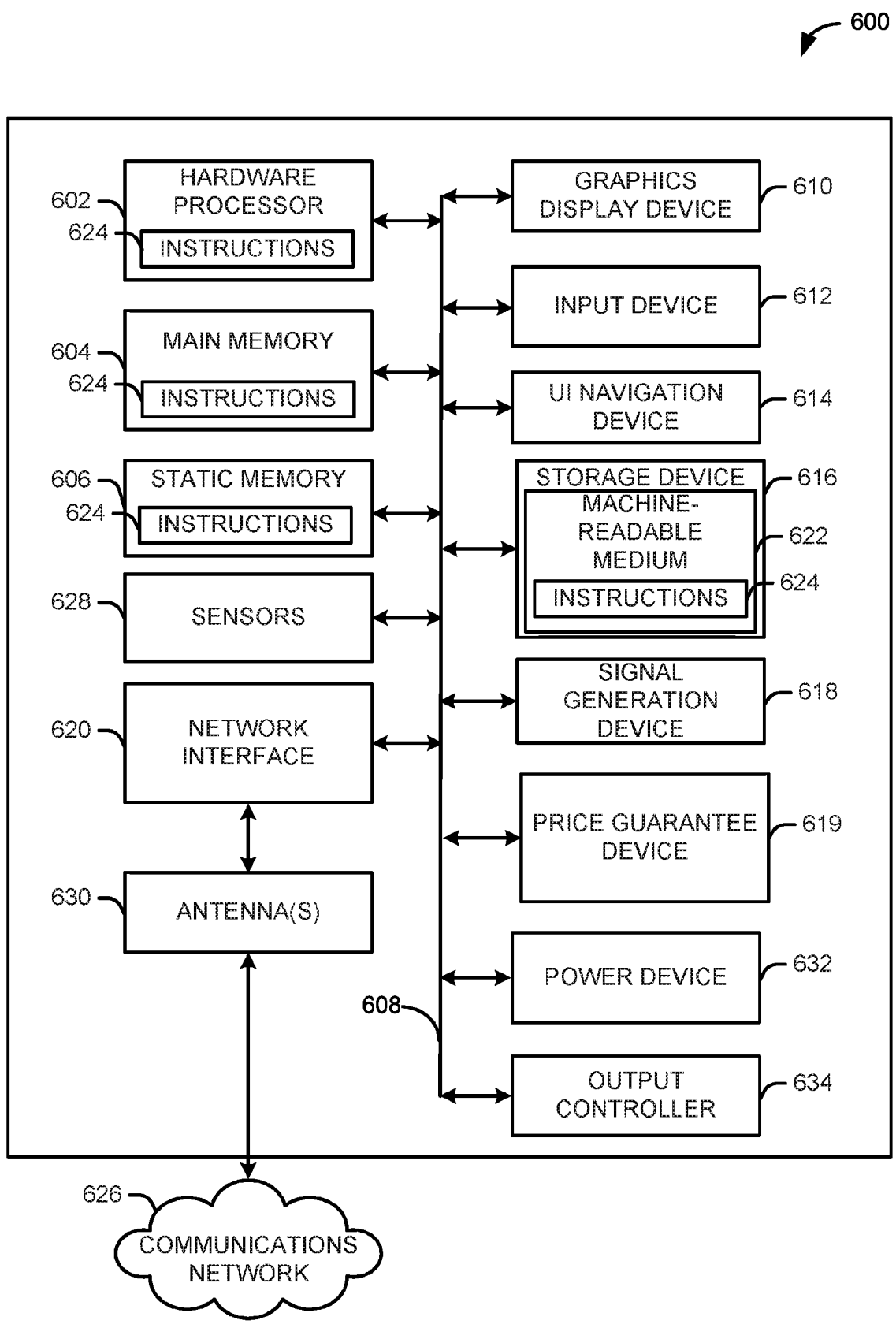
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the ESL 107 of FIG. 1, the point-of-sale 112 of FIG. 1, the computer system 202 of FIG. 2, the one or more gateway devices 240 of FIG. 2, the one or more price display devices 242 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a price guarantee device 619 (e.g., that can perform the functions as described in FIG. 1 and FIG. 2, the process 300 in FIG. 3, the process 400 of FIG. 4, and the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD- ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multistandard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., preestablished or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, by at least one processor of a first device of a retailer, a first price of a product, wherein the first price is presented in a virtual location of the retailer at a first time;
determining, by the at least one processor that a second price of the product is presented by an electronic shelf label at a physical location of the retailer at a second time before the first time;
determining, by the at least one processor, that the retailer is presenting conflicting prices of the product at the virtual location of the retailer and at the electronic shelf label at the physical location of the retailer;
determining, by the at least one processor and based on the determination that the retailer is presenting conflicting prices of the product, that a third price of the product is a most updated price of the product and represents a price increase with respect to the second price presented by the electronic shelf label at the second time;
generating, by the at least one processor, based on the determination that the retailer is presenting conflicting prices of the product, an application programming interface (API) call comprising an identifier of the price increase;
determining, by the at least one processor, based on the determination that the retailer is presenting conflicting prices of the product, and based on the identifier of the price increase, that the electronic shelf label maps to a unique device address;
transmitting, by the at least one processor, based on the determination that the retailer is presenting conflicting prices of the product, and based on the determination that the third price represents the price increase, a unicast transmission addressed to the unique device address to replace, at the electronic shelf label, first presentation of the second price with presentation of the third price;
refraining, by the at least one processor, prior to receiving an acknowledgement from the unique device address that the first presentation of the second price has been replaced at the electronic shelf label with presentation of the third price, based on the determination that the third price represents the price increase, from transmitting an instruction to replace, at a point-of-sale device at the physical location of the retailer, second presentation of the second price at the point-of-sale device with presentation of the third price;
identifying, by the at least one processor, the acknowledgment received from the unique device address; and
transmitting, by the at least one processor, based on receiving the acknowledgement, the instruction to replace, at the point-of-sale device, the second presentation of the second price with the presentation of the third price,
wherein the first price is an advertised price of the retailer, and
wherein the second price is a price charged for the product by the retailer.

2. The method of claim 1, wherein:
the electronic shelf label is at a retail location associated with the physical location,
the point-of-sale device is at the retail location,
determining that the retailer is presenting conflicting prices of the product comprises determining that the first price is less than the second price.

3. The method of claim 1, wherein:
the electronic shelf label is a first electronic shelf label at a retail location associated with the physical location,
the point-of-sale device is at the retail location, and
determining that the retailer is presenting conflicting prices of the product comprises determining that the first price is greater than the second price, further comprising:
determining a fourth price displayed by a second electronic shelf label at the retail location; and
determining that the fourth price is greater than the first price, wherein:
the third price is equal to the fourth price, and
the instruction is transmitted after expiration of a time period subsequent to receiving the acknowledgement.

4. The method of claim 1, further comprising:
receiving a fourth price of the product, the fourth price presented at the virtual location at the first time;
determining a fifth price of the product, the fifth price presented at the physical location at the second time, wherein the fourth price and the fifth price are member prices, and wherein the first price and the second price are non-member prices;
determining that the fourth price and the fifth price are different; and
transmitting a second unicast instruction addressed to the unique device address to replace, at the electronic shelf label, presentation of the fifth price with presentation of the fourth price.

5. A method, comprising:
receiving, by at least one processor of a first device of a retailer, a first price of a product and a first time, wherein the first price is presented in a virtual location of the retailer;
determining, by the at least one processor, that a second price of the product is presented at an electronic shelf label at a physical location of the retailer at a second time before the first time;
determining, by the at least one processor, that the retailer is presenting conflicting prices of the product at the virtual location of the retailer and at the physical location of the retailer;
determining, based on the determination that the retailer is presenting conflicting prices of the product at the virtual location of the retailer and at the physical location of the retailer, that a third price of the product is a most updated price of the product and represents a price increase with respect to the second price presented by the electronic shelf label at the second time;
generating, by the at least one processor, based on the determination that the retailer is presenting conflicting prices of the product, an application programming interface (API) call comprising an identifier of the price increase;
determining, by the at least one processor, based on the determination that the retailer is presenting conflicting prices of the product, and based on the identifier of the price increase, that the electronic shelf label maps to a unique device address;

transmitting, by the at least one processor, based on the determination that the retailer is presenting conflicting prices of the product at the virtual location of the retailer and at the physical location of the retailer and based on the determination that the third price represents the price increase, a unicast instruction addressed to the unique device address to replace, at the electronic shelf label, first presentation of the second price with presentation of the third price;

refraining, by the at least one processor, prior to receiving an acknowledgement from the unique device address that the first presentation of the second price has been replaced at the electronic shelf label with presentation of the third price, based on the determination that the third price represents the price increase, from transmitting an instruction to replace, at a point-of-sale device at the physical location of the retailer, second presentation of the second price at the point-of-sale device with presentation of the third price;

identifying, by the at least one processor, the acknowledgment received from the unique device address; and transmitting, by the at least one processor, based on receiving the acknowledgement, the instruction to replace, at the point-of-sale device, the second price as a charged price for the product with the third price as the charged price.

6. The method of claim 5, further comprising:
determining a fourth price of the product, at the physical location, and at a third time, the third time before the first time; and
determining a smallest price from among the first price, the second price, and the fourth price, wherein the first price is the smallest price.

7. The method of claim 5, wherein determining that the retailer is presenting conflicting prices of the product at the virtual location of the retailer and at the physical location of the retailer comprises determining that the first price is greater than the second price,
wherein the instruction is transmitted after expiration of a time period subsequent to receiving the acknowledgement.

8. The method of claim 7, further comprising:
determining a fourth price of the product, the fourth price presented at the physical location at a third time, the third time before the first time; and
determining a smallest price from among the first price, the second price, and the fourth price,
wherein the third price is greater than the smallest price.

9. The method of claim 7, wherein the time period begins after receiving the acknowledgement.

10. The method of claim 5, further comprising:
generating a first table entry indicative of the first price and the first time; and
determining a second table entry indicative of the second price and the second time, wherein determining that the retailer is presenting conflicting prices of the product at the virtual location of the retailer and at the physical location of the retailer is based on a comparison of the first table entry to the second table entry.

11. The method of claim 10, further comprising:
receiving a fourth price of the product, the fourth price presented at the virtual location at the first time, the second table entry further indicative of a fifth price of the product, the fifth price presented at the electronic shelf label at the second time, wherein the first price and the second price are non-member prices, and wherein the fourth price and the fifth price are member prices;

determining that the fourth price is equal to the fifth price; and transmitting a second unicast transmission addressed to the unique device address to replace, at the electronic shelf label, presentation of the fifth price with presentation of the fourth price.

12. The method of claim 10, further comprising:
receiving a fourth price of the product, the fourth price presented at the virtual location at the first time, the second table entry further indicative of a fifth price of the product, the fifth price presented at the electronic shelf label at the second time;
determining that the third price is different than the fourth price; and
transmitting a second unicast transmission addressed to the unique device address to replace, at the electronic shelf label, presentation of the fifth price with presentation of the fourth price.

13. The method of claim 5, wherein the virtual location is associated with a computer application where the product is sold.

14. The method of claim 5, wherein the refraining and the acknowledgment are associated with preventing the point-of-sale device from presenting the price increase prior to the electronic shelf label presenting the price increase.

15. The method of claim 5, further comprising:
determining, based on the API call, that the point-of-sale device is to present the second price until after the electronic shelf label has presented the price increase,
wherein the refraining is based on the determination that the point-of-sale device is to present the second price until after the electronic shelf label has presented the price increase.

16. A system comprising memory coupled to at least one processor of a retailer, the at least one processor configured to:
receive a first price of a product and a first time, wherein the first price is presented in a virtual location of the retailer;
determine that a second price of the product is presented at an electronic shelf label at a physical location of the retailer at a second time before the first time;
determine that the retailer is presenting conflicting prices of the product at the virtual location of the retailer and at the physical location of the retailer; and
determine, based on the determination that the retailer is presenting conflicting prices of the product at the virtual location of the retailer and at the physical location of the retailer, that a third price of the product is a most updated price of the product and represents a price increase with respect to the second price presented by the electronic shelf label at the second time;
generate, based on the determination that the retailer is presenting conflicting prices of the product, an application programming interface (API) call comprising an identifier of the price increase;
determine, based on the determination that the retailer is presenting conflicting prices of the product, and based on the identifier of the price increase, that the electronic shelf label maps to a unique device address;
transmit, based on the determination that the retailer is presenting conflicting prices of the product at the virtual location of the retailer and at the physical location of the retailer and based on the determination that the third price represents the price increase, a unicast transmission addressed to the unique device address to replace, at the electronic shelf label, first presentation of the second price with presentation of the first price;

refrain, prior to receiving an acknowledgement from the unique device address that the first presentation of the second price has been replaced at the electronic shelf label with presentation of the third price, based on the determination that the third price represents the price increase, from transmitting an instruction to replace, at a point-of-sale device at the physical location of the retailer, second presentation of the second price at the point-of-sale device with presentation of the third price;

identify the acknowledgment received from the unique device address; and transmit, based on receiving the acknowledgement, the instruction to replace, at the point-of-sale device, the second price as a charged price for the product with the third price as the charged price.

17. The system of claim 16, the at least one processor being further configured to:

determine a fourth price of the product, at the physical location, and at a third time, the third time at a same time as the second time; and determine a smallest price from among the first price, the second price, and the fourth price, wherein the first price is the smallest price.

18. The system of claim 16, wherein to determine that the retailer is presenting conflicting prices of the product at the virtual location of the retailer and at the physical location of the retailer comprises to determine that the first price is greater than the second price, wherein the instruction is transmitted after expiration of a time period subsequent to receiving the acknowledgement.

19. The system of claim 16, further comprising:

a listener configured to:

detect prices of the product presented at the virtual location, the prices comprising the first price;

initiate a workflow based on detection of the first price, wherein the API call is transmitted as part of the workflow; and a server configured to:

receive the API call from the workflow; and receive the acknowledgement.

20. The system of claim 16, wherein the at least one processor is further configured to:

determine, based on the API call, that the point-of-sale device is to present the second price until after the electronic shelf label has presented the price increase, wherein the refraining is based on the determination that the point-of-sale device is to present the second price until after the electronic shelf label has presented the price increase.

\* \* \* \* \*